United States Patent [19]

Haentjens et al.

[11] Patent Number: 5,546,865
[45] Date of Patent: Aug. 20, 1996

[54] DEVICE FOR REDUCING THE AERODYNAMIC DRAG OF A CAVITY IN A FLOW, AND A VEHICLE, IN PARTICULAR A RAIL VEHICLE, PROVIDED WITH SUCH A DEVICE

[75] Inventors: Stéphen Haentjens, La Rochelle; Philippe Chappet, Cravanche; Jean-Luc Tessier, Marseille; Jean-Paul Ardissone, Marseille; Jean-Pierre Guibergia, Marseille, all of France

[73] Assignee: GEC Alsthom Transport S.A., Paris, France

[21] Appl. No.: 408,649

[22] Filed: Mar. 22, 1995

[30] Foreign Application Priority Data

Mar. 24, 1994 [FR] France .................................. 94 03472

[51] Int. Cl.⁶ .................................................. B61D 17/00
[52] U.S. Cl. .................................... 105/1.2; 296/180.4
[58] Field of Search ............................. 105/1.1, 1.2, 1.3; 296/180.1, 180.2, 180.3, 180.4, 180.5

[56]    References Cited

U.S. PATENT DOCUMENTS 2,182,640 12/1939 Pohlhausen ............................ 105/1.2
2,243,906  6/1941 Huet ...................................... 105/1.1
4,199,185  4/1980 Woolcock ......................... 105/1.2 X
4,779,915 10/1988 Straight .

FOREIGN PATENT DOCUMENTS 417270   10/1936 Belgium .
896717    5/1983 Belgium .
0539904A1 5/1993 European Pat. Off. .
805960   10/1936 France .
160103    5/1983 Germany ........................... 296/180.4
9003626 U 7/1990 Germany .

Primary Examiner—Robert J. Oberleitner
Assistant Examiner—Kevin D. Rutherford
Attorney, Agent, or Firm—Sughrue, Mion, Zinn, Macpeak & Seas

[57]    ABSTRACT

The present invention relates to a device for reducing the aerodynamic drag of a cavity in a flow, said device comprising a blade disposed upstream from the cavity so that it overlaps at least one edge of the cavity and the corresponding wall of the corresponding vehicle, and so that it is in the vicinity of said wall. The invention also relates to a vehicle, in particular a rail vehicle, provided with such a device.

5 Claims, 2 Drawing Sheets

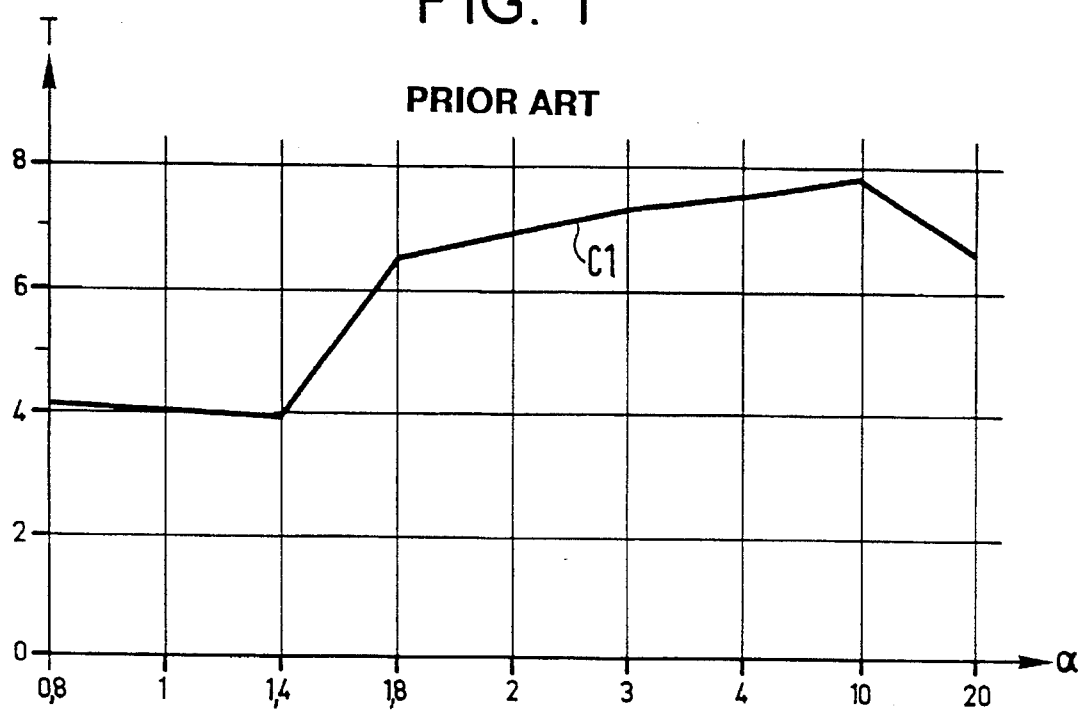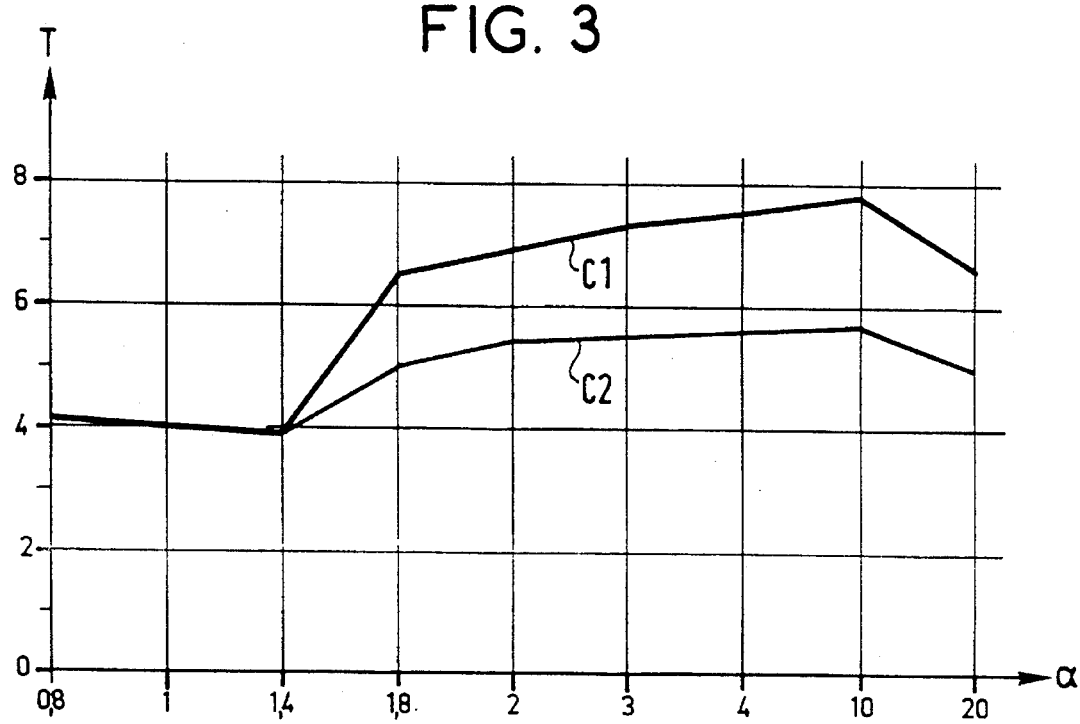

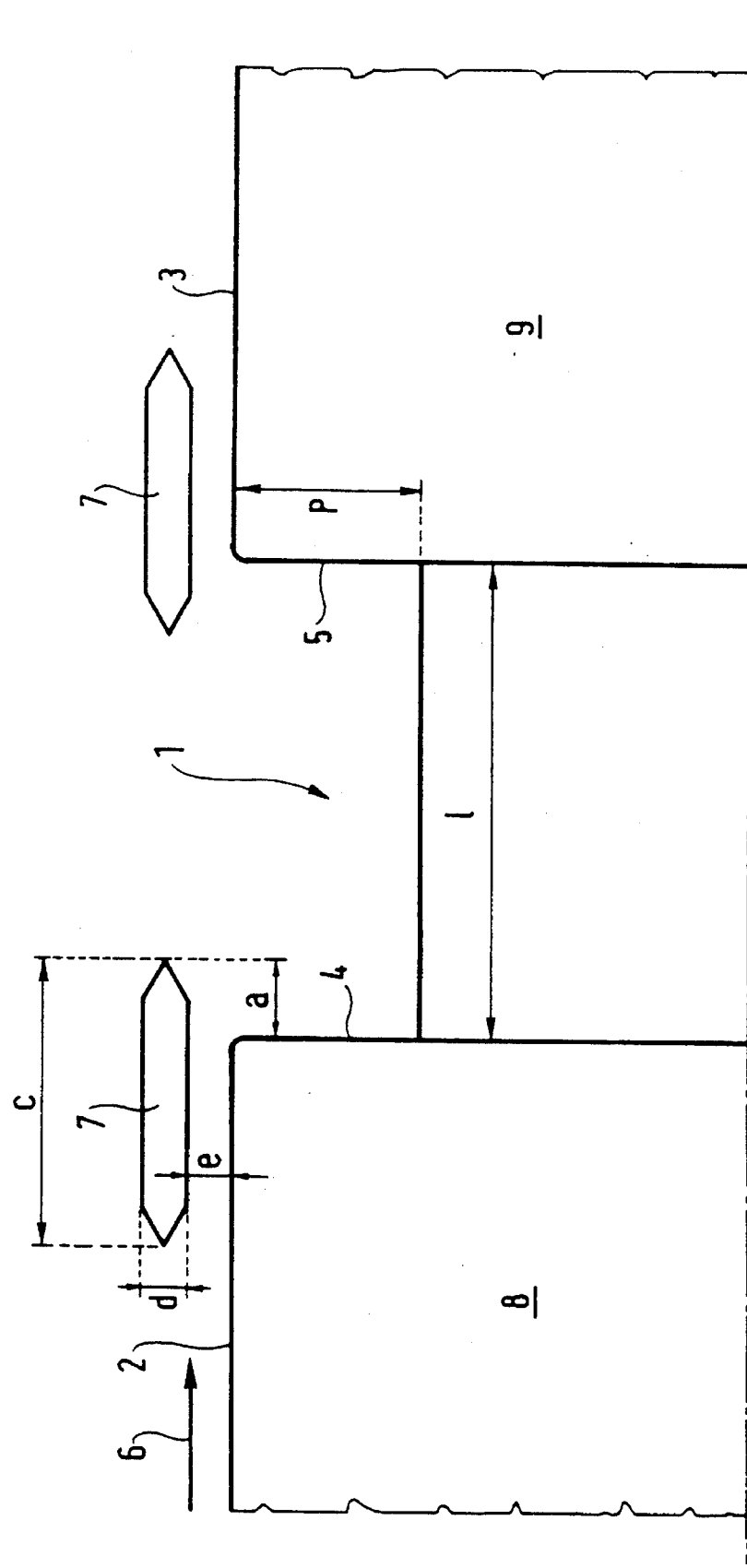

DEVICE FOR REDUCING THE AERODYNAMIC DRAG OF A CAVITY IN A FLOW, AND A VEHICLE, IN PARTICULAR A RAIL VEHICLE, PROVIDED WITH SUCH A DEVICE

The present invention relates to devices making it possible to modify the aerodynamic profile of a vehicle, in particular a rail vehicle, i.e. to devices modifying the resistance to motion generated by cavities in its outside surface. More particularly, the present invention relates to a device for reducing the aerodynamic drag of a cavity in a flow, as well as to a vehicle, in particular a rail vehicle, provided with such a device.

BACKGROUND OF THE INVENTION

Transport vehicles, in particular rail vehicles, are required to reduce the resistance to motion so as to reduce the size of the traction equipment, and so as to limit energy consumption.

In this way, profiles are sought that are as aerodynamic as possible. Unfortunately, the outside surface of a train has various cavities, such as: gaps between cars, pantograph-receiving bays, and under-body bogie bays, which are all obstacles to train motion, and they increase noise level.

At high speeds, a large portion of the resistance to motion is due to the aerodynamic drag of the vehicles.

A portion of the drag is due to changes in the shape of the outside streamlining of the vehicles, and in particular to cavities. The aerodynamic profile of a train is most modified by the gaps between vehicles in the train and by the bogie-receiving bays.

Known prior art means that enable those problems to be solved consist in placing rubber flaps between the cars so as to provide aerodynamic continuity. A drawback with that solution is that it prevents easy access to equipment. Furthermore, such devices are not reliable over time, and they increase the time that needs to be spent on repair and maintenance. The same applies to bogie-receiving bays and pantograph-receiving bays where fixed or moving streamlining systems mask the cavities. Such streamlining hides equipment to the detriment of safety.

Therefore, the problems posed by this type of cavity are not solved satisfactorily.

Document FR-A-805 960 describes a device for reducing resistance to motion due to gaps or other interruptions in vehicles.

That prior art device consists of at least one deflecting surface disposed on the vehicle at the interruption, in particular at the ends of the cars or other vehicles suitable for being coupled together.

The deflecting surfaces are disposed so that they extend the surface of the vehicle over which the relative air flow slides, and so disposed that they make the relative air flow more uniform by preventing it from penetrating into the interruption where it would otherwise tend to create a turbulence zone.

Prior art document FR-A-805 960 teaches that the deflecting surfaces are placed substantially in the plane of the relative air flow, i.e. so that they extend the walls of the vehicle. The deflecting surfaces may be set back slightly, but, in principle, they must not project outwardly relative to the walls.

As taught by that document, the deflecting surfaces are based on deflecting the air streams outwards. From that document, it can be understood that the deflecting surfaces act as deflectors only and that they have no technical effect on the flow of air inside the cavities.

Document BE-A-417 270 describes equipment for streamlining moving bodies. That equipment includes deflecting surfaces resulting from members whose position can be changed, and which are hinged about rocking axes, so that they can be put into various angular positions, thereby either reducing the resistance to motion of the moving body, or else increasing it.

As taught in that document, the deflecting surfaces are based on deflecting the air streams laterally. From that document, it can also be understood that the deflecting surfaces act as deflectors only and that they have no technical effect on the flow of air inside the cavities.

The problems posed by this type of cavity are not solved satisfactorily for the reasons given below.

It is known that the aerodynamic drag of a cavity depends to a large extent on the ratio $\alpha$ of its width $l$ divided by its depth P.

As indicated in FIG. 1, for a given cavity width $l$, the drag is at its minimum when the ratio a has a value that is close to 1. The value of the drag doubles suddenly when the ratio $\alpha$ is close to 2, it remains approximately constant until the ratio $\alpha$ is equal to 10, and it then falls off again slowly when the ratio $\alpha$ is greater than 10.

The cavities considered in the prior art, e.g. those described in the above-mentioned documents have ratios $\alpha$ lying in the range 2 to 10, and they therefore correspond to the worst cases.

A solution that is difficult to implement consists in closing the cavities.

Another solution consists in bringing the ratio $\alpha$ to 1. This solution is also difficult to implement because, to do so means either reducing the width $l$, which is generally imposed by clearances, or else increasing the volume of the cavity, and this reduces the available space inside the vehicle.

Another solution is given in Document FR 91 13 510 to the Applicant.

Document FR 91 13 510 to the Applicant describes means making it possible to reduce the resistance to motion generated by cavities. For each cavity, those means include a profile disposed in the vicinity of the cavity but not facing the cavity, the profile being held at a determined distance from the outside surface of the train, the determined distance enabling said resistance to motion to be reduced.

That solution suffers from the drawbacks that the profiles must be disposed at a relatively long distance from the cavity and at a relatively high height from the wall. That solution involves problems of overall vehicle size, and of clearance outside the vehicle.

OBJECTS AND SUMMARY OF THE INVENTION

The device proposed by the Applicant for reducing the aerodynamic drag of a cavity in a flow offers the advantage of taking into account the dimensions of the cavity, as well as the clearance of the vehicle.

In other words, the device of the invention for reducing aerodynamic drag does not require the dimensions of the cavity to be varied, nor the clearance of the vehicle to be increased significantly.

The invention provides a device for reducing the aerodynamic drag of a cavity in a flow, said device comprising a blade disposed so that it overlaps at least one edge of the cavity and the corresponding wall of the corresponding vehicle, and so that it is in the vicinity of the wall.

The invention also provides a device for reducing aerodynamic drag and that satisfies at least one of the following characteristics:

the blade is disposed parallel to the wall of the vehicle;
the blade is such that:

$0 \leq a/c \leq 1$
$0.05 \leq c/l \leq 0.5$
$0 \leq d/E \leq 0.1$
$0.03 \leq e/E \leq 0.07$ where:

the letter l designates the width of the cavity;

the letter a designates the length of that portion of the blade which overlaps the cavity;

the letter c designates the width of the blade;

the letter d designates the thickness of the blade;

the letter e designates the distance between the wall of the vehicle and the blade; and the letter E designates the thickness of the boundary layer of the flow upstream from the cavity; and the blade is such that:
a/c is equal to 0.33;
c/l is equal to 0.21;
d/E is equal to 0.028; and
e/E is equal to 0.043.

The invention also provides a vehicle, in particular a rail vehicle, provided with at least one device for reducing the aerodynamic drag of a cavity.

The invention also provides a vehicle provided with two devices for reducing the aerodynamic drag of a cavity, the two devices being disposed symmetrically on either side of the cavity, one device being disposed upstream from the cavity relative to the flow and the other device being disposed downstream therefrom.

BRIEF DESCRIPTION OF THE DRAWINGS

Other objects, characteristics, and advantages of the invention will appear on reading the following description of the device for reducing the aerodynamic drag of a cavity in a flow, the description being given with reference to the accompanying drawings, in which:

FIG. 1 shows a curve which, for a given cavity width l, gives the different values of the aerodynamic drag T as a function of the values of the ratio α;

FIG. 2 is a view in horizontal section through the device of the invention for reducing the aerodynamic drag of a cavity in a flow; and FIG. 3 shows two curves giving the value of the aerodynamic drag T as a function of the values of the ratio α respectively when the cavity is provided with the device of the invention for reducing aerodynamic drag, and when it is not provided therewith.

MORE DETAILED DESCRIPTION

FIG. 1, described above, shows a curve C1 which, for a given width l of a prior art cavity, gives the different values of the aerodynamic drag T as a function of the values of the ratio α.

FIG. 2 is a plan view of the device of the invention for reducing the aerodynamic drag of a cavity in a flow.

The cavity 1 is delimited by a first wall 2 of a vehicle 8 and by a second wall 3 of the vehicle 9, thereby defining a first cavity edge 4 and a second cavity edge 5.

In FIG. 2, the letter l designates the width of the cavity 1, and the letter P designates its depth.

In accordance with the invention, the device for reducing the aerodynamic drag of a cavity 1 in a flow 6 comprises a blade 7 disposed upstream from the cavity 1 so that it overlaps at least one of the edges 4, 5 and the corresponding wall 2, 3 of the corresponding vehicle 8, 9, and so that it is in the vicinity of said wall 2, 3.

Preferably, the blade 7 is disposed parallel to the wall 2, 3 of the vehicle 8, 9.

The letters a, c, d, and e also appear in FIG. 2:

the letter a designates the length of that portion of the blade which overlaps the cavity;

the letter c designates the width of the blade;

the letter d designates the thickness of the blade;

the letter e designates the distance between the wall of the vehicle and the blade; and the letter E designates the thickness of the boundary layer of the flow upstream from the cavity.

The book entitled "Boundary layer theory" by Schlichting, published in 1968 by McGraw-Hill, New York, gives a definition of the boundary layer of a flow.

The invention consists in selecting values from an infinite number of values for ratios between the various dimensions of the blade.

Table 1 below gives the preferred optimum values for various ratios between various dimensions of the blade, when the ratio α is not less than 2 and not more than 20.

TABLE 1

| RATIO | VALUE |
| --- | --- |
| a/c | 0.33 |
| c/l | 0.21 |
| d/E | 0.028 |
| e/E | 0.043 |

The dimensions and the position of the blade may vary a little around the optimal values given above, without significantly degrading the reduction obtained in the value of the drag by means of the presence of the blade.

Table 2 below gives the ranges of values of the various ratios between the dimensions of the blade, over which ranges the reduction obtained in the value of the drag by means of the presence of the blade is not degraded significantly.

TABLE 2

| MINIMUM VALUE | RATIO | MAXIMUM VALUE |
| --- | --- | --- |
| 0 | a/c | 1 |
| 0.05 | c/l | 0.5 |
| 0 | d/E | 0.1 |
| 0.03 | e/E | 0.07 |

An unexpected effect of selecting the ratios between dimensions of the blade in this way is that the reduction in drag obtained by the device of the invention for reducing aerodynamic drag is in the approximate range 30% to 40%, once the drag of the blades themselves has been taken into account.

It has been observed that the blade disposed upstream from the cavity reduces the fluctuations in speed over the cavity. This means that the blade reduces the shear stresses of the flow in that zone, thereby reducing the quantity of energy transmitted by the flow to the fluid present in the cavity.

It appears that, for values of α lying in the range 1.5 to 20, and especially in the range 2 to 10, this quantity of energy is particularly large when the cavity is not provided with a device of the invention, whereas it is comparatively small for values of α of less than 1.5. That is why the device of the invention is effective when α lies in the range 1.5 to 20.

The aerodynamic drag of the cavity equipped with a device of the invention is therefore close to that which the cavity would otherwise have if the ratio α were equal to 1.

Surprisingly, further testing has shown that, when the ratio α is equal to 1, the device does not modify the drag of the cavity, once the drag of the blades themselves has been taken into account.

FIG. 3 shows a curve C2 giving the various values of the aerodynamic drag T as a function of the values of the ratio α when the cavity is equipped with the device of the invention for reducing aerodynamic drag. Curve C1, shown in FIG. 1 and giving the various values of the aerodynamic drag T as a function of the values of the ratio α when the cavity is not equipped with the device of the invention for reducing aerodynamic drag, is reproduced in FIG. 3.

The blades are fixed permanently to the outside surface of the vehicle by means of known supports (not shown). The supports may themselves be fixed to the vehicles by riveting or by welding.

Naturally, in order to make it possible to use the cavity when the train is travelling in either direction, two devices of the invention for reducing the aerodynamic drag may be disposed symmetrically on either side of the cavity, one device 7 being disposed upstream from the cavity relative to the flow, and the other device 7 being disposed downstream therefrom, as per FIG. 2.

The invention also relates to a vehicle, in particular a rail vehicle, provided with such a device for reducing the aerodynamic drag of a cavity in a flow.

We claim:

1. In combination, a rail vehicle and at least one device for reducing the aerodynamic drag by 30% to 40% of a cavity in an airstream flow formed by said rail vehicle and a second rail vehicle spaced therefrom, said cavity being delimited by a first wall of said vehicle and a second wall of said second vehicle, said first and second walls further defining a first cavity edge and a second cavity edge, said cavity having a cavity width l between said vehicles and a cavity depth P extending inwardly from said first and second walls at said cavity edges, said device comprising a blade disposed in the vicinity of said first wall and being spaced therefrom such that said blade overlaps said first cavity edge, and wherein said blade is such that:

$0 \leq a/c \leq 1$ $0.05 \leq c/l \leq 0.5$ $0 \leq d/E \leq 0.1$ $0.03 \leq e/E \leq 0.07$ and where:

the letter a designates the length of that portion of the blade which overlaps the cavity;

the letter c designates the width of the blade;

the letter d designates the thickness of the blade;

the letter e designates the distance between the wall of the first vehicle and the blade; and the letter E designates the thickness of the boundary layer of the flow upstream from the cavity.

2. The device according to claim 1, in which:

the blade is such that:

a/c is equal to 0.33;

c/l is equal to 0.21;

d/E is equal to 0.028; and e/E is equal to 0.043.

3. In combination a train comprising:

first and second spaced rail vehicles;

a cavity in an airstream flow formed by said first and second spaced rail vehicles delimited by a first wall of said first vehicle and a second wall of said second vehicle, further defining respectively, a first cavity and a second cavity edge, said cavity having a cavity width l between said vehicles and a cavity depth P extending inwardly from said first and second walls at said cavity edges, a pair of devices for reducing the aerodynamic drag of said cavity by 30% to 40%, said pair of devices being disposed respectively symmetrically on either side of said cavity, said devices comprising respective blades disposed upstream from said cavity relative to the flow and downstream therefrom, said blades respectively overlapping respective first and second edges of said cavity and said respective wall of said first and second rail vehicles and being in the vicinity of respective first and second walls, and wherein for each blade the blade is such that:

$0 \leq a/c \leq 1$ $0.05 \leq c/l \leq 0.5$ $0 \leq d/E \leq 0.1$ $0.03 \leq e/E \leq 0.07$ and wherein:

the letter a designates the length of that portion of each blade which overlaps the cavity;

the letter c designates the width of each blade;

the letter d designates the thickness of each blade;

the letter e designates the distance between the wall of a respective vehicle and each blade; and the letter E designates the thickness of the boundary layer of flow upstream and downstream from the cavity.

4. The train as claimed in claim 3, wherein the blades are disposed parallel to the respective walls of respective rail vehicles.

5. The train as claimed in claim 3, in which:

each blade is such that:

a/c is equal to 0.33;

c/l is equal to 0.21;

d/E is equal to 0.028; and e/E is equal to 0.043.

* * * * *